United States Patent [19]
Andersen

[11] Patent Number: 5,606,504
[45] Date of Patent: Feb. 25, 1997

[54] CROP SWATH-WIDTH MEASUREMENT USING ACOUSTIC TRANSDUCERS

[75] Inventor: David P. Andersen, Burnsville, Minn.

[73] Assignee: Lockheed Martin Corporation, Bethesda, Md.

[21] Appl. No.: 389,992

[22] Filed: Feb. 17, 1995

[51] Int. Cl.$^6$ .......................... A01D 45/00; G06F 165/00
[52] U.S. Cl. ...................... 364/424.07; 364/563; 180/167
[58] Field of Search .................. 364/424.02, 424.07, 364/563; 348/120; 180/167, 168, 169; 56/10.2, 10.2 F

[56] References Cited

U.S. PATENT DOCUMENTS

| | | | |
|---|---|---|---|
| 4,228,636 | 10/1980 | Homburg | 56/10.2 |
| 4,835,691 | 5/1989 | Rotem et al. | 364/424.02 |
| 4,918,441 | 4/1990 | Bohman | 340/901 |
| 5,019,983 | 5/1991 | Schutten et al. | 364/424.07 |
| 5,327,345 | 7/1994 | Nielsen et al. | 364/424.07 |
| 5,410,479 | 4/1995 | Coker | 364/424.02 |

OTHER PUBLICATIONS

Massa Products Corporation product description and price list for M–4000 Ultrasonic Measurement & Control System; Feb. 1992.

*Primary Examiner*—Michael Zanelli
*Attorney, Agent, or Firm*—Glenn W. Bowen

[57] ABSTRACT

A combine or harvesting machine has a header on its front end which is moved into a crop swath when harvesting the crop. The swath width of the crop in front of the header is measured with two acoustic range sensors that are mounted on opposite ends of the header in a horizontal plane so they face each other. The data that is received may be utilized either to determine crop yield or to control an automatic steering control, or both.

2 Claims, 1 Drawing Sheet

CROP SWATH-WIDTH MEASUREMENT USING ACOUSTIC TRANSDUCERS

BACKGROUND OF THE INVENTION

1. Field of the Invention

This invention is directed to the measurement of the swath-width of an agricultural crop with acoustic measuring devices mounted on opposite ends of the header of a combine or harvesting machine.

2. Discussion of the Background

When a combine is used to harvest a growing crop, the driver will commonly have to watch the ends of the header on the front of the machine in order to steer the machine into the crops being harvested close to the center of the crop swath being worked. Other agricultural machines employ auto-steering mechanisms to control the steering of the machine which provide a way to steer into the center of the crop swath. In both cases the goal is to keep the header as full of crop as possible.

U.S. Pat. No. 4,835,691, issued May 30, 1989 to Abraham Rotem et al., entitled "Positioning System Particularly Useful for Position Agricultural Implements," shows the use of two opposite facing acoustic transceivers. The two transceivers, each consisting of an acoustic transmitter and receiver, are located on one side of the header of an agricultural machine so that as the machine is headed along the rows of the crop, each transmitter transmits signals toward a row on the outside of each transceiver. Returned echo signals from the crop rows are then received by the respective receivers which are used to measure the distance of the transceivers from each of the two adjacent rows.

While the two transceivers of the Rotem et al. patent provide signals that may be used to maintain a position with respect to two adjacent crop rows, they do not allow the swath width to be measured and, therefore, they provide no information on crop yield during harvesting. Furthermore, the Rotem et al. system requires that planting be done in rows and it is not suitable for both non-row crops, such as small grains, and row crops, such as corn.

The use of acoustic transducers is also shown for the control of a road grader which is disclosed in U.S. Pat. No. 5,327,345, issued Jul. 5, 1994 in the name of Nielsen et al. In the system of the Nielsen, et al. patent, acoustic transducers are used to measure the vertical and lateral distance from a reference point of a reference circuit in order to control the vertical and lateral position of a grading blade. In one embodiment of the Nielsen et al. system, one of the transducers transmits an acoustic wave that is reflected off of the surface and is detected by both of the transducers. In another embodiment a pair of transducers is positioned orthogonally to one another to measure the distance between each transducer and a respective orthogonal reference.

SUMMARY OF THE INVENTION

Crop swath-width measurement is achieved with a pair of acoustic transceivers each consisting of a transmitter and a receiver. Each transceiver is mounted on opposite ends of the header of a combine or harvesting machine wherein the header is wider than the swath-width of a crop being harvested. The transmitter and receiver of one transceiver faces the transmitter and receiver of the other transceiver so that acoustic signals transmitted by the transmitters are intercepted by the opposite edges of the crop swath and are reflected back to the receivers. In this manner, the distance between the ends of the header and the outer edges of the crop swath are measured as the crop is being harvested, which may be used to provide ongoing yield measurements. This information is utilized to measure the width of the crop swath whether or not the crop appears in rows. The distance information received may be utilized to control the vehicle so that it is steered into the crop so that the crop swath is at the center of the header thereby maximizing the amount of crop that is engaged by the header.

TECHNICAL DESCRIPTION OF THE INVENTION

Figure 1:
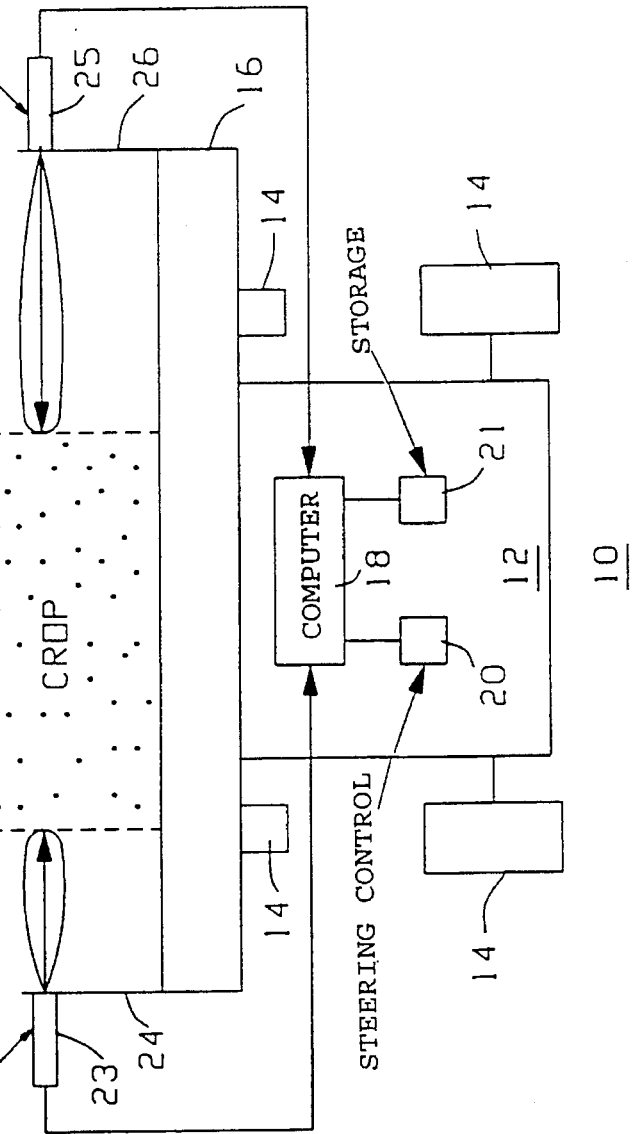
FIG. 1 is a top diagrammatic view of a combine or harvesting machine which is engaging a crop swath and which has a set of acoustic transmitters and receivers mounted on opposite ends of the header.

The invention is described by reference to FIGS. 1 and 2. A diagrammatic top-view of a combine or harvesting machine has two sets of acoustic transmitters and receivers which are on opposite ends of the header of the machine. Together, the transmitter and a receiver are called a transceiver, which may consist of a single unit or two separate units. The vehicle 10 has a frame 12 on which an engine (not shown) is mounted and a seat (not shown) for an operator. Wheels 14, or tracks, are provided for locomotion. The front end of the vehicle has an elongated header 16 which is headed into the crop swath and engages the crop as it is being harvested.

The vehicle is preferably equipped with a computer 18, an automatic steering control 20 of the kind which is available for automatically controlling and correcting the steering of the vehicle and a yield monitoring storage device 21.

At opposite ends of the header there are two acoustic transceivers 23 and 25 mounted on mounting elements 24, 26 which extend forward of the header on opposite ends thereof. The transceivers are mounted so that they are directed toward each other so their transmitted beams impinge upon opposite sides of the crop swath as the machine moves into the crop.

Transducers for implementing the invention are commercially available. One such type of transducer which may be employed is sold by Massa Products Corporation of Hingham, Mass., under the product designation M-4000. In particular, either a type M-411/26 or M-411/40 is preferred for these transducers. Use of ultrasonic transducers of the Massa Products type with a computer will be able to provide range measurements up to approximately ten feet from the edge of a crop with an accuracy of one inch. When the data is used as a parameter in a steering control mechanism or for computer determination of yields, the numerical value of ranges beyond ten feet will generally be of little interest.

Crops that may be subject to yield measurement with this invention may be quite short in height. For example, crops, such as stunted soybeans which are on the order of 24 inches high, may still provide yield measurements. At least half of the crop should appear in the beam at the maximum range in order to reflect the signals which then should be strong enough to enable detection of the beam. Since crops are not particularly strong reflectors of sound waves, the maximum range available from the transceiver must be derated considerably. However, the swath width of growing crops, whether or not they are planted in rows, of the following types should be detectable: soybeans, corn, wheat, alfalfa, rice and other plants.

When the acoustic range transducers 23 and 25 are mounted in front of and parallel to the front of the header, one on each side of the crop swath and facing inward, the height of the sensor is chosen so that the acoustic beam from the transmitter will intersect with the ground or crop stubble at the range of ten feet. Any crop of a lesser range, or that is taller, will return the signal.

Massa Products Corporation has developed a range measuring equation for use with their transducers. This equation is as follows:

$D = 2*R*\arctan(0.5*a)$ where D=spot diameter in inches

R=target range in inches a=total beam angle in degrees, and * means multiplication The M-411/40 transducer has an accuracy of approximately 0.2% when the range is between 2 and 20 feet. It has a beam-width of 15° when a horn accessory is used with it and operates at a frequency of 40 KHz. The M-411/26 model has an accuracy of 0.1% in the 2 to 30 feet range. It also has a beam-width of 15° with a horn and a frequency of 26 KHz. These figures give a 2-to-1 derating of range and a 13% margin for beam width so the accuracy that is calculated should be better than one-half inch at a ten-foot range.

Because the crop swath is located intermediate the acoustic transceivers, interference between them is generally not a problem. When the transceivers are used on certain crops, however, interference between their acoustic beams may be eliminated by operating the transducers at two different frequencies, or by alternately operating the transmitters and receivers of each of the transducers so that when the receiver from one transceiver is turned on, the transmitter of the other transceiver is turned off.

Figure 2:
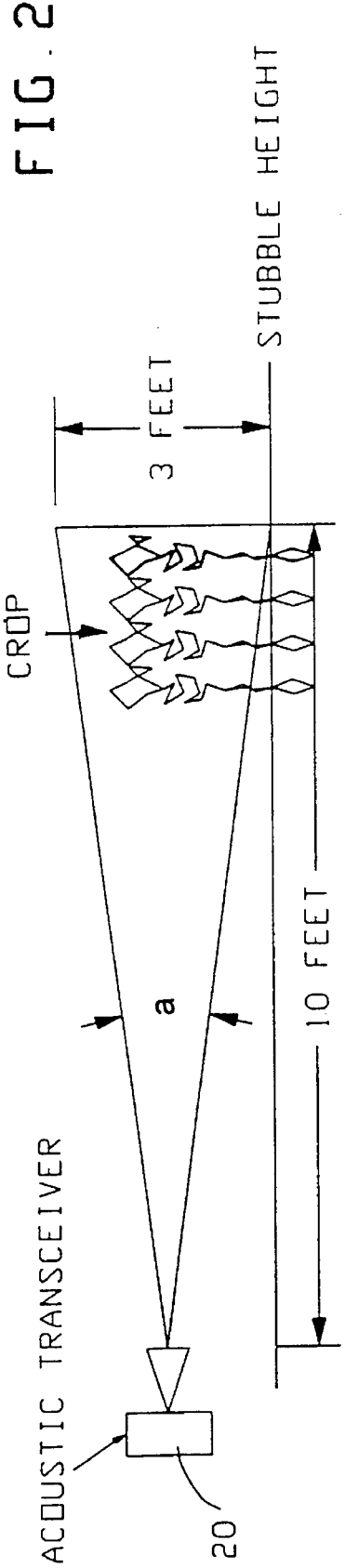
FIG. 2 is a diagrammatic view looking into the edge of a growing crop swath which illustrates the impingement of an acoustic wave beam from a transmitter on the crop.

FIG. 2 is an edge view of a crop wall which illustrates the beam-width (a) for the transceiver 23 which it expands outwardly from the transducer so that at a range of ten feet when it contacts the ground at one of the outer plants, the crop wall will intersect one of the outer plants, the crop wall will intersect the beam such that the entire portion of this plant will be in the acoustic wave-path.

What is claimed is:

1. A method of controlling automatic steering of an agricultural vehicle wherein said vehicle comprises a support structure having opposite ends, a computer, an automatic steering mechanism, a pair of wave-beam transmitters and a pair of wave-beam receivers wherein said transmitters and receivers are mounted so that one transmitter and one receiver are mounted on each of the opposite ends of said support structure wherein said support structure extends beyond the crop end walls, the method comprising the steps of:

mounting one wave-beam transmitter and one wave-beam receiver on one end of the support structure and another wave-beam transmitter and another wave-beam receiver on the opposite end of the support structure so that they face each other;

activating said transmitters to produce incident wave-beams that are transmitted from each of said transmitters so that said incident wave-beams intercept the crop end wall that is nearest to each one of said transmitters and so that said incident wave-beams become reflected wave-beams off of said crop end walls and travel back to the receiver that is closest to the end wall from which said incident wave-beams were emitted;

receiving said reflected wave-beams at said receivers on the opposite ends of said support structure, coupling output signals from both of said receivers to said computer;

utilizing said computer to measure the swath width of the crop; and controlling said automatic steering mechanism with said computer to steer the vehicle into the center of said swath width.

2. The method of claim 1 in which said wave-beam transmitters and receivers transmit and receive acoustic wave-beams, respectively.

* * * * *